UNITED STATES PATENT OFFICE.

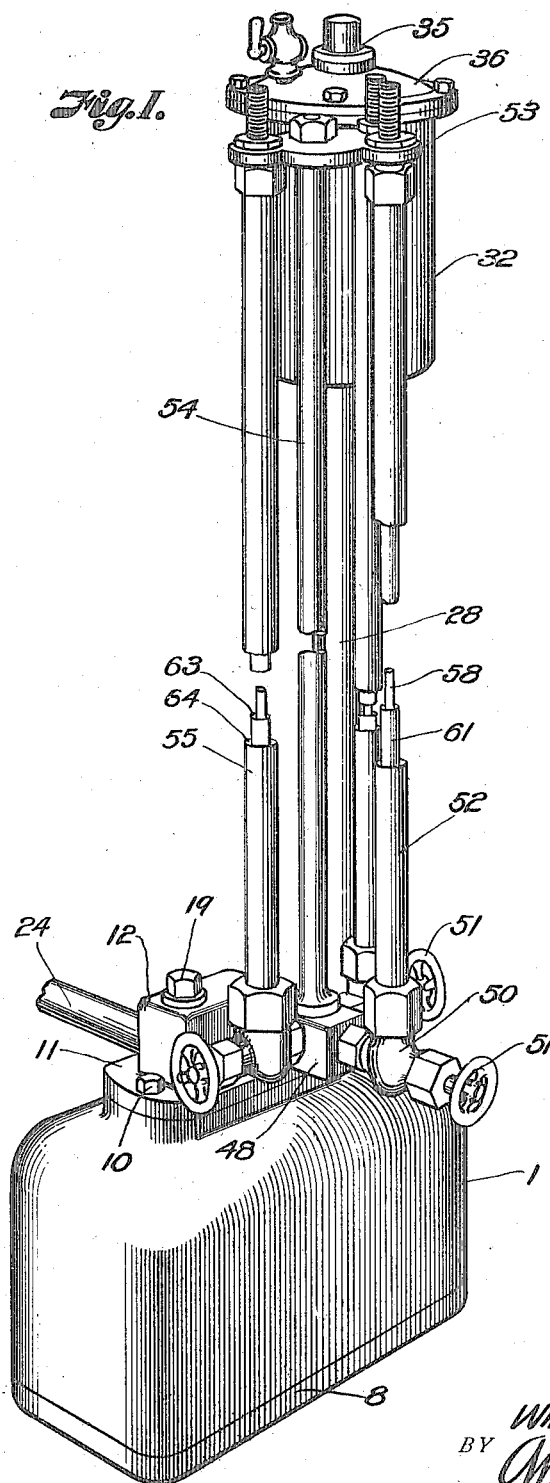

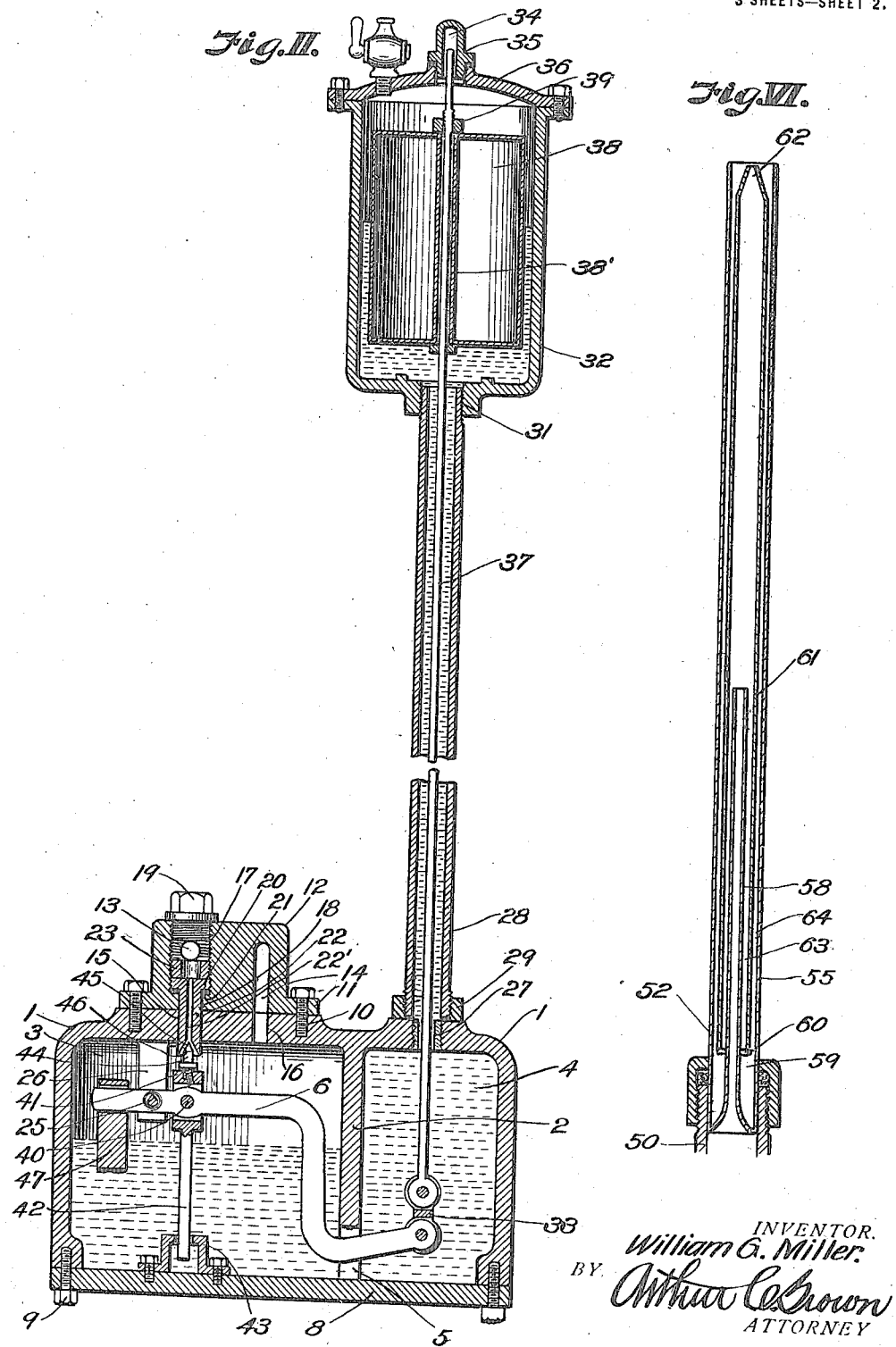

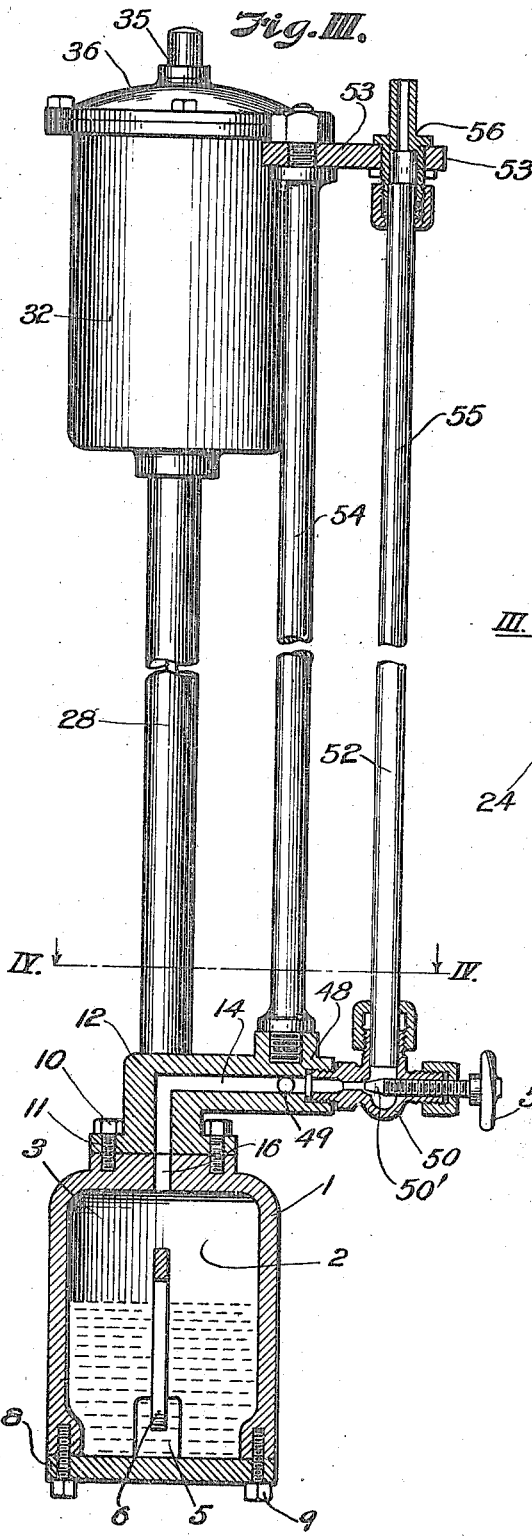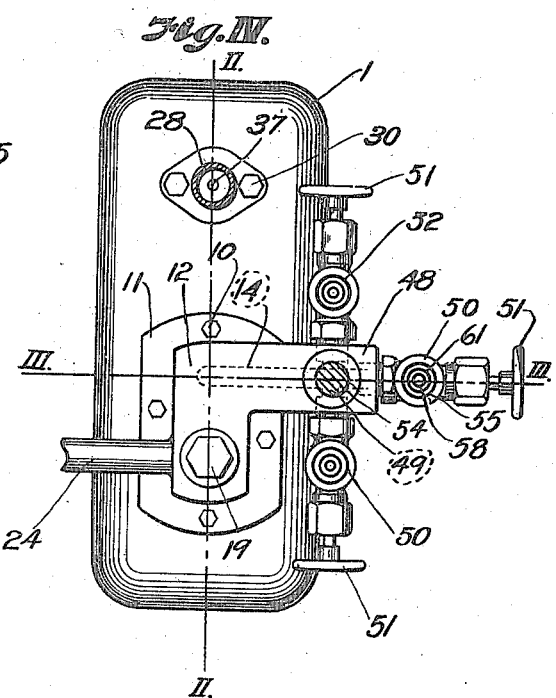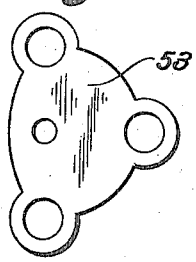

WILLIAM G. MILLER, OF KANSAS CITY, MISSOURI.

PRESSURE-REGULATOR.

1,263,920.  Specification of Letters Patent.  Patented Apr. 23, 1918.

Application filed October 15, 1917.  Serial No. 196,642.

*To all whom it may concern:*

Be it known that I, WILLIAM G. MILLER, a citizen of the United States, residing at Kansas City, in the county of Jackson and State of Missouri, have invented certain new and useful Improvements in Pressure-Regulators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pressure regulators, and more particularly to a device of this character for use in gas lines for reducing and stabilizing a flow of gas from a source of supply under high pressure to apparatus requiring a constant supply at a relatively low pressure; the principal object of the invention being to provide a device of this character wherein the admission of the gas from a high pressure source is controlled by a valve, and wherein the valve is under control of float mechanism that may be adjusted to balance at pre-determined levels for various pressures; and wherein the desired pressure in the housing is maintained by a head pressure provided by a column of liquid stored in a standpipe which communicates with the housing and contains the floating mechanism.

In accomplishing this object, I have provided improved details of structure, the preferred forms of which are illustrated in the accompanying drawings, wherein:—

Figure I is a perspective view of a pressure regulator constructed according to the present invention.

Fig. II is a longitudinal vertical section of the same on the line II—II, Fig. IV.

Fig. III is a transverse vertical section on the line III—III, Fig. IV.

Fig. IV is a horizontal sectional view on the line IV—IV, Fig. III.

Fig. V is a plan view of the standard spider for supporting the upper ends of the gage glass units.

Fig. VI is an enlarged longitudinal sectional view of one of the gage units.

Referring more in detail to the drawings:—

1 designates a housing, wherein mechanism for controlling the flow of gas is contained, and which is preferably formed from a single casting with a transverse partition wall 2 dividing the housing into separate chambers 3—4 and having an opening 5 at its base, through which fluid may flow from one chamber to the other, and within which a float controlled valve beam 6 may operate.

The housing 1, in its preferred construction, is open at the base, but when the parts are assembled is closed by a base plate 8 that is attached to the body of the housing by means of cap screws 9, and the joint between the parts is sealed by any suitable packing (not shown) to prevent leakage therethrough.

Mounted on the top of the housing above the chamber 3, and attached thereto by means of cap screws 10 extended through a flange 11 integrally formed thereabout, is a head 12, provided at opposite ends with laterally opening inlet and outlet channels 13—14 which respectively communicate with the chamber 3 through registering openings 15—16 in the upper wall of the housing; the channel 14 communicating directly with the opening 16, while the channel 13 leads into a vertical, interiorly threaded channel 17 leading from the top of the head to adjacent the base thereof, where it communicates with a smaller concentrically bored channel 18, which in turn registers with the opening 15. The top of the channel 17 is closed by threading a plug 19 thereto, and seated against the shoulder 20 formed at the base of the channel 17 is the head 21 of a valve tube 22 which is extended through the channel 18 and registering opening 15, and into the chamber 3; the tube being held tightly in place by means of a ring 23 that is threaded into the channel and tightened against the head.

With this arrangement, gas may be delivered into the housing through the channels 13, 17 and channel 22' of the tube 22, and delivered therefrom through the opening 16 and channel 14; the outer end of the channel 13 being threaded to receive the end of a supply conduit 24 which may lead from the gas supply.

Pivotally supported within the chamber 3, on a cross pin 25 extending between ears 26 depending from the top wall of the housing, is the valve beam 6, the same being turned downwardly in the valve chamber 3 and extended through the opening 5 in the partition 2 so that it has a free end located within the chamber 4, directly below an opening 27 in the top of the housing; and mounted vertically on the housing is a standpipe 28, the lower end of which is threaded into a collar 29 attached to the housing by cap screws 30 so that the end of the pipe registers with the opening 27.

At its upper end the stand pipe 28 is threaded into the base opening 31 of a cylindrical float chamber 32, and the pipe is of such length that, when it is filled with liquid, sufficient head pressure will be provided to maintain a certain pressure in the housing chambers.

Pivotally attached to the free end of the beam 6 by means of a short connecting link 33, and extending upwardly through the opening 27, pipe 28 and slidable at its upper end in a guide channel 34 of a cap 35 threaded into the cover 36 of the float chamber 32, is a connecting rod 37, and fixed thereon within the chamber is a float 38 which moves according to the rise and fall of liquid within the float chamber to actuate the beam 6.

The float 38 comprises a closed cylinder having a longitudinal, central channel 38' therethrough for receiving the connecting rod 37 and is adjusted on the rod by means of a nut 39 threaded onto the rod and seating against the upper end of the float.

Pivotally mounted on the beam 6 within the valve chamber 3 by means of a cross pin 40, is the head 41 of a valve stem 42; the stem having its lower end slidably contained within a guide bracket 43 that is attached to the base plate 8 of the housing and the head having a transverse channel for receiving the beam 6. Threaded into the upper end of the head 41 is a valve point 44 having a tapered end 45, which is adapted to seat within an outwardly tapered seat 45 attached at the lower end of the channel 22' of the tube 22. The beam and float are counterbalanced by a weight 47 attached on the end of the beam 6 within the chamber 3.

To deliver gas from the regulator to the various points of distribution, I provide the head 12 at one side with a laterally extending neck 48 having a plurality of exteriorly opening channels 49 therein which lead from the channel 14, whereby communication is established with the chamber 3, and communicating with the openings 49 through valved fittings 50 threaded into the channels 49, and containing valves 50' that may be actuated to open or close communication therethrough by the actuation of hand wheels 51 are vertically arranged gage units 52 supported at their upper ends by a spider plate 53 mounted at the upper end of a standard 54 threaded into the top of the housing 1.

Each of the gage units is made up of coaxially arranged tubes of glass or other transparent material, and comprises an exterior tube 55 which seats at its upper end in a fitting 56 through which connection is made with a distributing conduit (not shown) to deliver gas to its place of use. Located concentrically within the tube 55 is a tube 58, of lesser length and smaller diameter than the exterior tube and which communicates directly through the valve 50 with the outlet channel 14; the base end of the tube 58 being flared outwardly to meet the ends of the tube 55 to form a closed annular chamber 59 for containing a pressure indicating fluid, as hereinafter described.

Supported within the annular channel 59 by studs 60 projecting outwardly from opposite walls of the tube 58, is a tube 61, the upper end of which is provided with a restricted outlet orifice 62, through which gas delivered into the gage is required to pass before entering the distributing conduit 57.

Assuming that the parts are so constructed, in assembling the device the beam 6 with the valve stem 42 and weight 47 attached thereto, is located within the housing, and pivotally mounted between the ears 26 with the lower portion of the beam located within the partition opening 5, the stem point 44 seated in the channel 22' of the tube 22, and the free end of the beam connected with the rod 37. The base plate 8 is then applied to the housing and the housing chambers filled with liquid to the required depth.

The head 12 is then attached to the housing with the channels 13—14 registering with the openings 15—16, and the intake conduit 24 properly attached to the head and a source of gas supply. The valves 50 are then inserted in the channels 49, and the gage tubes inserted in the valves and attached to the distributing conduits 57.

Before the gages are inserted in the valves 50 the channels 63 and 64 which together make up the channel 59 are filled with a suitable liquid to a level slightly below the upper ends of the tubes 58, *i. e.*, to about the center of the gages. With the gages in place, gas under high pressure is then admitted to the intake channel 13, and passed through the open valve and into the chamber 3, is fed through the outlet channel 14 and is distributed through the channels 49 and valves 50 to the gage tubes 58, and ultimately to the distributing conduits 57.

As the incoming gas is under a higher pressure than is desired for use in the apparatus at the terminals of the distributing conduits, it will force the liquid in the chamber 3 through the opening 5 into the chamber 4, and upward through the opening 27 and pipe 28 into the chamber 32 to effect the lifting of the float so that the beam 6 is lifted to actuate the valve point 44 against the seat 46 to close the inlet; it being apparent that as the pressure in the valve chamber increases with the increase in supply the float is proportionately lifted and the supply shut off.

As the gas escapes through the outlets 14 and 49 for use, pressure in the valve chamber 3 becomes less, and the head of liquid in the chamber 4, standpipe 28 and float chamber 32 induces a flow back into the valve chamber, thereby permitting the float 38 to lower. Lowering of the float actuates the valve stem 44 to open the channel 22' and thereby permit the intake of more gas. In this way a constant supply of gas under a substantially constant pressure, materially less than that at the original supply source, is maintained in the chamber 3, the pressure at which the supply in the valve chamber is maintained being dependent on the head of liquid in the standpipe and fluid chamber, by which the float is controlled.

The gas delivered to the various outlet channels is admitted to the tubes as desired by adjustment of the valves 50, so that not only is the flow of gas automatically controlled by the float 38 but is also manually controlled by the valves 50.

Gas entering the gages through the tubes 58 is delivered into the upper ends of the tube 61 and escapes through the orifice 62 to the distributing conduit, but as the orifice is of very small area and the intake tube relatively large, a back pressure in the tube 61 is created which forces the liquid therein downardly within chamber 63, and upwardly within the chamber 64; the difference in level making it possible for an observer to determine the pressure at which gases are escaping to the distributing conduits, and as the area of the discharge orifice is known, and the pressure thus established, the flow of gas in volume may be calculated.

It is apparent that with apparatus of this character the needle valve controlling flow to the valve chamber of the regulator will admit a limited flow through the valve seat, and that the flow is determined by the position of the stem point 44 on the head 41, and the adjusted position of the float 38 on the connecting rod.

The volumetric flow of gas through the entire apparatus is controlled by the manually operable valves 50' and indicated by the spread of the liquid in gages 52 and a sufficient and constant pressure of gas can at all times be maintained in chamber 3 by the proper adjustment of float 38 and needle valve 44.

It is also apparent that the gages permit the operator to ascertain at all times the volume of gas being delivered to the individual using apparatus, and that one regulator may be made to serve a plurality of distributing conduits.

Having thus described my invention, what I claim as new therein, and desire to secure by Letters-Patent, is:—

1. A pressure regulator comprising a housing having intake and outlet channels, a beam pivotally mounted in the housing, a valve connected with the beam, a standpipe communicating with the housing, a float located in the standpipe, and means, extending through said standpipe, connecting the beam and float.

2. A pressure regulator comprising a housing having intake and outlet channels, a beam pivotally mounted in the housing, a valve connected with the beam, a standpipe communicating with the housing, a float chamber mounted on the standpipe, a float located in the float chamber, and means, extending through said standpipe, connecting the beam and float.

3. A pressure regulator comprising a housing containing separate chambers having a communicating channel, one of the chambers having intake and outlet channels, a beam pivotally mounted in one of the chambers and extending into the other, a valve connected with the beam, a standpipe mounted on the housing and opening thereinto, a float chamber at the upper end of said standpipe, a float located in the float chamber, and means, extending through said standpipe, connecting the beam and float.

4. A pressure regulator comprising a housing containing separate chambers having a communicating channel, one of the chambers having intake and outlet channels, a beam pivotally mounted in one of the chambers and extending into the other, a valve connected with the beam, a standpipe mounted on the housing and opening thereinto, a float chamber at the upper end of said standpipe, a connecting rod attached to the beam and extending through said standpipe into the float chamber, and a float adjustably mounted on said rod and located in said float chamber.

5. A pressure regulator comprising a housing having a partition dividing its interior into separate chambers, and having an opening at its lower edge, one of said chambers having intake and outlet channels, a beam pivotally mounted in one of the chambers and extending through the partition opening into the other chamber, a valve adjustable on the beam and projected into the intake opening, a standpipe mounted on the housing and opening into the closed chamber, a float chamber mounted on the standpipe, a rod pivotally connected at its lower end to the valve beam, and extending through the standpipe into the float chamber, and a float adjustably mounted on said rod and located in the said float chamber.

In testimony whereof I affix my signature.

WILLIAM G. MILLER.